(12) United States Patent
Wei et al.

(10) Patent No.: US 8,411,087 B2
(45) Date of Patent: Apr. 2, 2013

(54) NON-LINEAR BEAM TRACING FOR COMPUTER GRAPHICS

(75) Inventors: Li-Yi Wei, Redwood City, CA (US);
Baoquan Liu, Beijing (CN); Xu Yang, Beijing (CN); Ying-Qing Xu, Beijing (CN); Baining Guo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1094 days.

(21) Appl. No.: 12/038,814

(22) Filed: Feb. 28, 2008

(65) Prior Publication Data

US 2009/0219286 A1    Sep. 3, 2009

(51) Int. Cl.
*G06T 17/00*  (2006.01)

(52) U.S. Cl. ........ 345/426; 345/419; 345/420; 345/423; 345/424

(58) Field of Classification Search ............ 345/419, 345/420, 424, 426, 423
See application file for complete search history.

(56) References Cited

U.S. PATENT DOCUMENTS

| | | | |
|---|---|---|---|
| 4,317,369 | A | 3/1982 | Johnson |
| 4,928,250 | A | 5/1990 | Greenberg et al. |
| 6,751,322 | B1 | 6/2004 | Carlbom et al. |
| 6,757,446 | B1 | 6/2004 | Li et al. |
| 6,956,570 | B2 | 10/2005 | Munshi |
| 7,126,605 | B1 | 10/2006 | Munshi et al. |
| 7,212,207 | B2 | 5/2007 | Green et al. |
| 7,233,328 | B2 * | 6/2007 | Christensen et al. ......... 345/423 |
| 7,548,238 | B2 * | 6/2009 | Berteig et al. .............. 345/426 |
| 7,952,583 | B2 * | 5/2011 | Waechter et al. ............ 345/426 |
| 2007/0098290 | A1 | 5/2007 | Wells | |

FOREIGN PATENT DOCUMENTS

WO    9301561 A1    1/1993

OTHER PUBLICATIONS

Overbeck et al. "A Real-time Beam Tracer with Application to Exact Soft Shadow", The Eurographics Association 2007.*
Ghazanfarpour et al. "A Beam Tracing Method with Precise Antialiasing for Polyhedral Scenes". Published 1998.*
Heckbert; et al., "Beam Tracing Polygonal Objects", Computer Graphics Laboratory, New York Institute of Technology, Old Westbury, NY 11568, SIGGRAPH '84, pp. 119-127, Jul. 1984.
Purcell; et al., "Ray Tracing on a Stream Processor", Date: 2004, pp. i-xii, 1-113.
Hou; et al., "Real-time multi-perspective rendering on graphics hardware", Rendering Techniques'06 (Proc. of the Eurographics Symposium on Rendering), pp. 93-102.

(Continued)

*Primary Examiner* — Kimbinh T Nguyen
(74) *Attorney, Agent, or Firm* — Lyon & Harr, LLP; Katrina A. Lyon

(57) ABSTRACT

A non-linear beam tracing technique that supports full non-linear beam tracing effects including multiple reflections and refractions for computer graphics applications. The technique introduces non-linear beam tracing to render non-linear ray tracing effects such as curved mirror reflection, refraction, caustics, and shadows. Beams are allowed to be non-linear where rays within the same beam are not parallel or do not intersect at a single point. Such is the case when a primary beam bounces off of a surface and spawns one or more secondary rays or beams. Secondary beams can be rendered in a similar manner to primary rays or beams via polygon streaming. Beyond smooth ray bundles, the technique can also be applied to incoherent ray bundles which is useful for rendering bump mapped surfaces.

19 Claims, 6 Drawing Sheets

OTHER PUBLICATIONS

Funkhouser, T., N. Tsingos, I. Carlbom, G. Elko, M. Sondhi, J. E. West, G. Pingali, P. Min, A. Ngan, A beam tracing method for interactive architectural acoustics, J. Acoust. Soc. Am., Feb. 2004, vol. 115, No. 2, pp. 739-756.

Wald, I., T. Ize, A. Kensler, A. Knoll, S. G. Parker, Ray tracing animated scenes using coherent grid traversal, ACM Trans. Graph., Jul. 2006, vol. 25, No. 3, pp. 485-493.

* cited by examiner

NON-LINEAR BEAM TRACING FOR COMPUTER GRAPHICS

BACKGROUND

Computer graphics have advanced significantly in the past years, especially in light of the increased popularity of video gaming. Various techniques have been employed to create fast and realistic computer graphics for various applications and to overcome common problems with rendering scenes and objects in computer graphics applications.

Reflections and refraction are difficult to model in computer graphics applications because they often produce non-linear rays or beams. For reflection, the ultimate goal is to render curved reflections of nearby objects with fully dynamic motion in real time. However, in the past in an attempt to meet such a goal, it has been necessary to either assume distant objects, planar reflectors, static scenes, limited motion for frame-to-frame coherence, or to rely on extensive pre-computation for all possible motion parameters. For example, some methods allow curved mirror reflection of distant objects but not for nearby objects. Additionally, some previous rendering techniques have required fine tessellation of scene geometry for rendering curvilinear effects. This requires a high geometry computation workload regardless of the original scene complexity, which is often quite simple for interactive applications such as games. Refraction poses an even bigger challenge than reflection, as even planar refraction can produce non-linear effects. Common rendering techniques typically handle only nearly planar refractors or only far away scene objects, but not refraction of near objects.

Some techniques for displaying computer graphics include ray tracing and beam tracing. Ray tracing is a rendering algorithm where visualisations of programmed scenes are produced using a technique which follows rays from the eyepoint outward, rather than originating at the light source. Ray tracing efficiently provides accurate simulations of reflection and refraction of light off of objects in a scene. However, most existing ray tracing techniques store scene geometry in a database and pre-compute certain data structures for efficient rendering. As such ray tracing is less suitable for rendering dynamic scenes.

Beam tracing is a derivative of ray tracing that replaces rays, which have no thickness, with beams. Beams are shaped like unbounded pyramids, with polygonal cross sections and with a beam base that intersects the film or sensor plane of the camera capturing the scene. Beam tracing combines the flexibility of ray tracing and the speed of polygon rasterization in computer graphics applications. One primary advantage of beam tracing is efficiency as it can render individual beams via polygon rasterization which is readily performed by conventional graphics processing units (GPUs). Beam tracing can also resolve sampling, aliasing and level of detail issues that plague conventional ray tracing. However, beam tracing to date has been only able to process linear transformations. Thus, beam tracing has only been applicable to linear effects such as planar mirror reflections but not to non-linear effects such as curved mirror reflection, refraction, caustics, and shadows. Note that such non-linear effects are not limited to curved geometry as even planar refraction is non-linear. Another common non-linear effect arises from bump-mapped surfaces as modeling them requires incoherent ray bundles that cannot be handled using non-linear beams. Furthermore, non-linear beam tracing is highly challenging because common graphics hardware, such as, for example, commodity graphics hardware, supports only linear vertex transformation and triangle rasterization.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The non-linear beam tracing technique described herein supports full non-linear beam tracing effects including multiple reflections and refractions. The technique introduces non-linear beam tracing to render non-linear ray tracing effects such as curved mirror reflection, refraction, caustics, and shadows. Beams are non-linear where rays within the same beam are not parallel or do not intersect at a single point. Such is the case when a primary beam bounces off of a surface and spawns one or more secondary rays or beams. Secondary beams can be rendered in a similar manner to primary rays or beams via polygon streaming. The technique can also be applied to incoherent ray bundles such as occur when rendering bump mapped surfaces.

In one embodiment of the non-linear beam forming technique, image data of a scene or object to be displayed on a computer display and a texture mesh are input. As a first step, a beam tree is constructed on a CPU by bouncing the primary beam off of scene reflectors/refractors to spawn secondary or higher order beams. This beam tree construction step produces beams with triangular cross sections, and may include both smooth and perturbed beams. These smooth and perturbed beams are typically non-linear with the exception of each primary beam. After the beam tree is constructed on a CPU, the content of the beams are then rendered on a GPU. More specifically, in beam parameterization, for each point P on the beam base triangle of a beam an associated ray with a specific origin and direction are computed. A bounding triangle of each scene triangle of the image data projected onto a corresponding beam base triangle is computed for all smooth beams (beams that are not perturbed by a bump map). A bounding triangle for each of any perturbed beams (beams perturbed by a bump map) is then computed by expanding the bounding triangle as computed for the smooth beams. Pixel shading is then performed by determining how each pixel P within each bounding triangle is rendered. Using the previous beam parameterization where for each pixel within the bounding triangle a ray origin and direction was computed, for each pixel the computed ray is followed into space. If the ray does not intersect a scene triangle the pixel is removed from further calculations. If the ray does intersect a scene triangle, the pixel attributes (depth, color or texture coordinates) are determined from the ray's intersection point with the scene triangle and these attributes at the ray's intersection with the scene triangle are used to render the pixel.

In the following description of embodiments of the disclosure, reference is made to the accompanying drawings which form a part hereof, and in which are shown, by way of illustration, specific embodiments in which the technique may be practiced. It is understood that other embodiments may be utilized and structural changes may be made without departing from the scope of the disclosure.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the non-linear beam tracing technique, reference is made to the accompanying drawings, which form a part thereof, and which is shown by way of illustration examples by which the non-linear beam tracing technique may be practiced. It is to be understood that other embodiments may be utilized and structural changes may be made without departing from the scope of the claimed subject matter.

1.0 Non-Linear Beam Tracing

Realizing non-linear beam tracing is challenging as typical graphics hardware units (GPUs) support only linear vertex transforms and triangle rasterization. One embodiment of the non-linear beam tracing technique described herein overcomes this by implementing a non-linear graphics pipeline on top of a standard GPU (e.g., a commodity GPU). Specifically, the technique can render a given scene triangle into a projection region with non-linear edges. This is achieved by customizing the vertex computations to estimate a bounding triangle for the projection region of a scene triangle. The scene triangle is then rendered by a shader/fragment module using the bounding triangle. For each pixel within the bounding triangle, the fragment module performs a simple ray-triangle intersection test to determine if the pixel is within the true projection of the scene triangle. If so, the pixel is shaded, otherwise it is discarded via fragment kill. The technique provides a bounding triangle computation that is both tight and easy to compute, and that remains so for both smooth and perturbed beams. Other technical contributions include beam parameterization that allows efficient bounding triangle estimation and pixel shading while ensuring projection continuity across adjacent beams. Some embodiments of the technique also employ a frustum culling strategy where the frustum sides are no longer planes, and a fast non-linear beam tree construction that supports multiple beam bounces. The non-linear beam tracing technique supports fully dynamic scenes or larger polygon-count scenes since it does not require pre-storage of a scene database. As a result, scenes can be rendered in real-time.

1.1 Operating Environment

Figure 1:
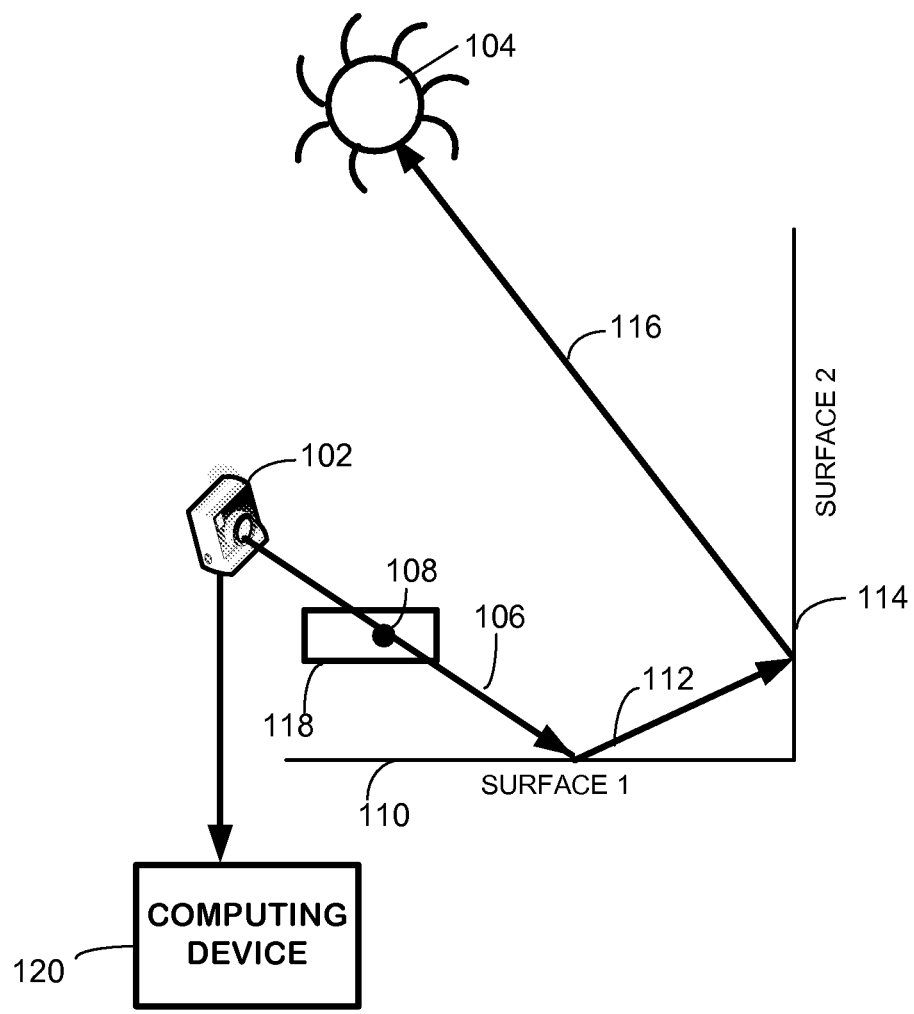
FIG. 1 provides an overview of an environment in which beam tracing is typically carried out.

FIG. 1 provides an exemplary operating environment wherein the non-linear beam tracing technique can be practiced. More specifically, FIG. 1 depicts a simple example of a path of rays recursively generated from the camera (or eye beam) 102 to a light source 104. The camera 102 can be connected to a computing device 120 that can manipulate the scene or image data. First, a ray is created at an eyepoint 102 and traced through a pixel 108 and into the scene, where it hits a surface 110. The surface reflects light in all directions. From that surface 110 the algorithm recursively generates a reflection ray 112, which is traced through the scene, where it hits another surface 114. Finally, another reflection ray 116 is generated and traced through the scene, where it hits the light source 104 and is absorbed. The color of the pixel now depends on the colors of both of the surfaces and the color of the light source. Beam tracing, vice ray tracing is used in the non-linear beam tracing technique described herein. In beam tracing, the rays 108, 112, 116, as shown in FIG. 1, which have no thickness in ray tracing, are replaced with beams in a beam tracing scenario. These beams are shaped like unbounded pyramids. In beam tracing, a pyramidal beam is initially cast through the entire viewing frustrum 118, for example, a computer display. This initial viewing beam is intersected with each polygon in the environment, from nearest to farthest. Each polygon that intersects with the beam must be visible, and is removed from the shape of the beam and added to a render queue. When a beam intersects with a reflective or refractive polygon, a new beam is created in a similar fashion to ray-tracing.

1.2 Exemplary Architecture

Figure 2:
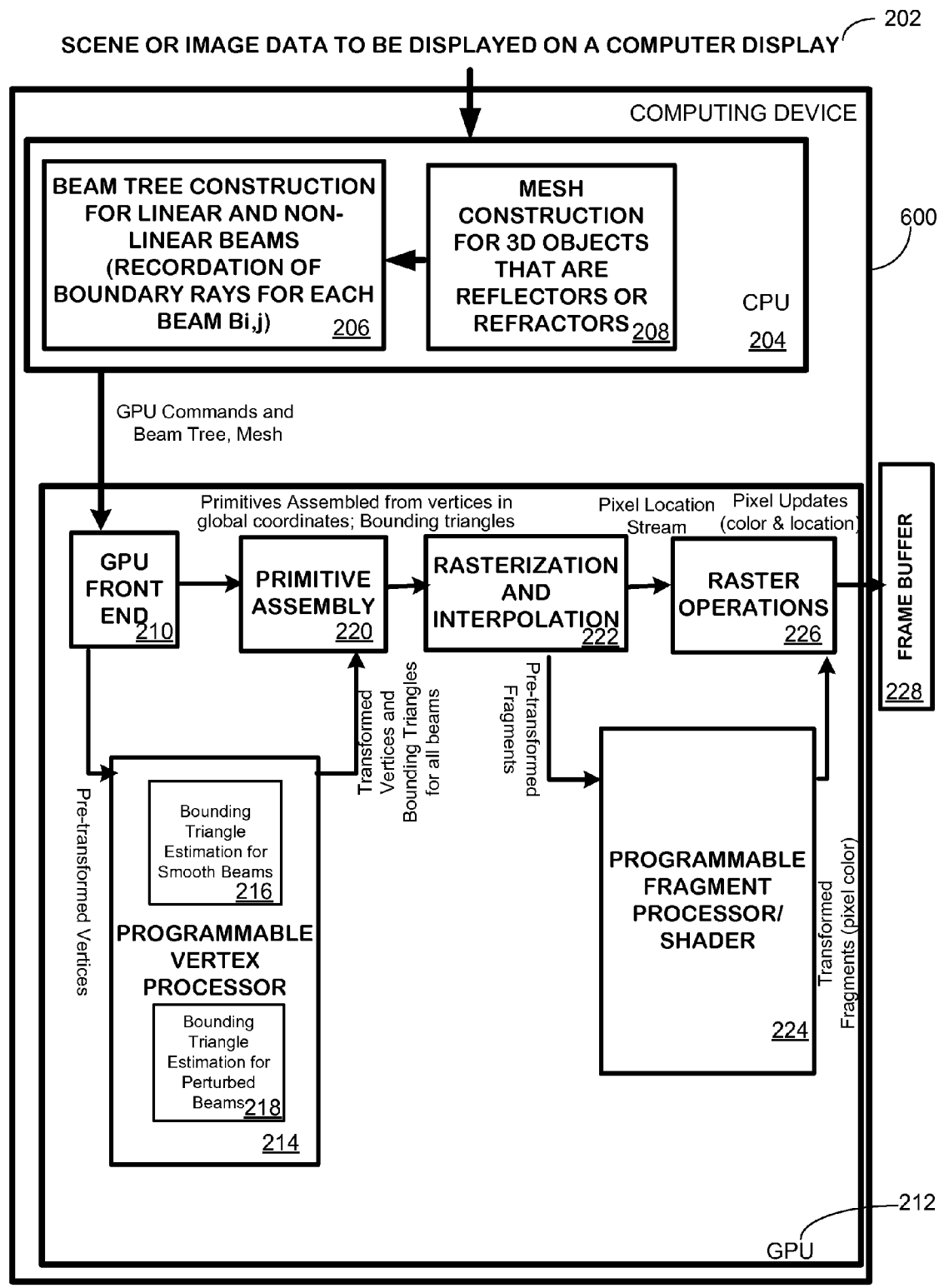
FIG. 2 is a diagram depicting one exemplary architecture in which one embodiment of the non-linear beam tracing technique can be employed.

FIG. 2 depicts an exemplary architecture in which the non-linear beamforming technique can be practiced. Image or scene data 202 of a three dimensional object that is to be displayed on a computer display (two dimensional by nature) is input into a computing device 600 such as will be described in more detail with respect to FIG. 6. The computing device 600 employs a central processing unit (CPU) 204 which hosts a beam tree construction module 206 and a mesh construction module 208. The beam tree construction module 206 constructs a beam tree for linear and non-linear beams, recording the boundary rays for each beam of the beam tree. The beam tree is built in a depth first order (i.e., using the tree root first, followed by the first layer, followed by the second layer). The beams caused by reflections and refractions are non-linear (a beam is linear only when all of its rays merge at a single eye point), while the primary beam (the beams prior to reflection/refraction) is linear. The mesh construction module 208 constructs one or more meshes for three dimensional objects that are reflectors or refractors. Objects that are not reflectors or refractors are simply obtained from the scene data set, as is the case in any typical rendering application. The meshes are used to overlay textures on once the pixel shading and location has been determined by the non-linear beam tracing technique as will be discussed later.

The beam tree, mesh, and any command from the CPU are input into a GPU front end module 210 which resides on a Graphics Processing Unit module 212. This GPU front end module 210 carves the scene or image data into triangular sections which are defined by vertices. The GPU front end module 210 sends the vertices of the triangular sections of the image data to a programmable vertex processor 214. The programmable vertex processor 214 transforms the vertices of the sections of the scene or image data into a global coordinate system and further computes a linear bounding triangle containing a projection of a scene triangle for each beam (e.g., beam base) of the beam tree. The programmable vertex processor 214 has separate modules for bounding triangle estimation for smooth beams 216 and for bounding triangle estimation for perturbed beams 218. The transformed vertices and bounding triangles for all beams are input into a primitive assembly module 220 that assembles primitives (geometric objects the system can draw) from the vertices in the global coordinates. The primitives and the bounding triangles are input into a rasterization and interpolation module 222 that determines the pixel location of fragments of the primitives (scene triangles) on the visible portions of the computer display. The computed fragments (scene triangles) are then input into a programmable fragment processor/shader module 224 that computes a color value for each pixel, rejecting pixels that are not inside the bounding triangle containing the projection of a scene triangle computed by the vertex processor 214. To do this the programmable fragment processor module 224 simply computes the ray (origin and direction according to the beam parameterization) for each pixel inside the bounding triangle and intersects the ray with the scene triangle to determine if it is a hit or miss; if it is a hit the pixel is shaded according to the intersection point, otherwise it is a miss and the pixel is killed. The pixel color and pixel location stream of the fragments are input into a raster operations module 226 that combines these inputs to update the color and location of every pixel, thereby creating the frame buffer or output image 228.

The following paragraphs provide an example of the rendering of a scene triangle within a beam using the exemplary architecture of the non-linear beam tracing technique described above.

Figure 3:
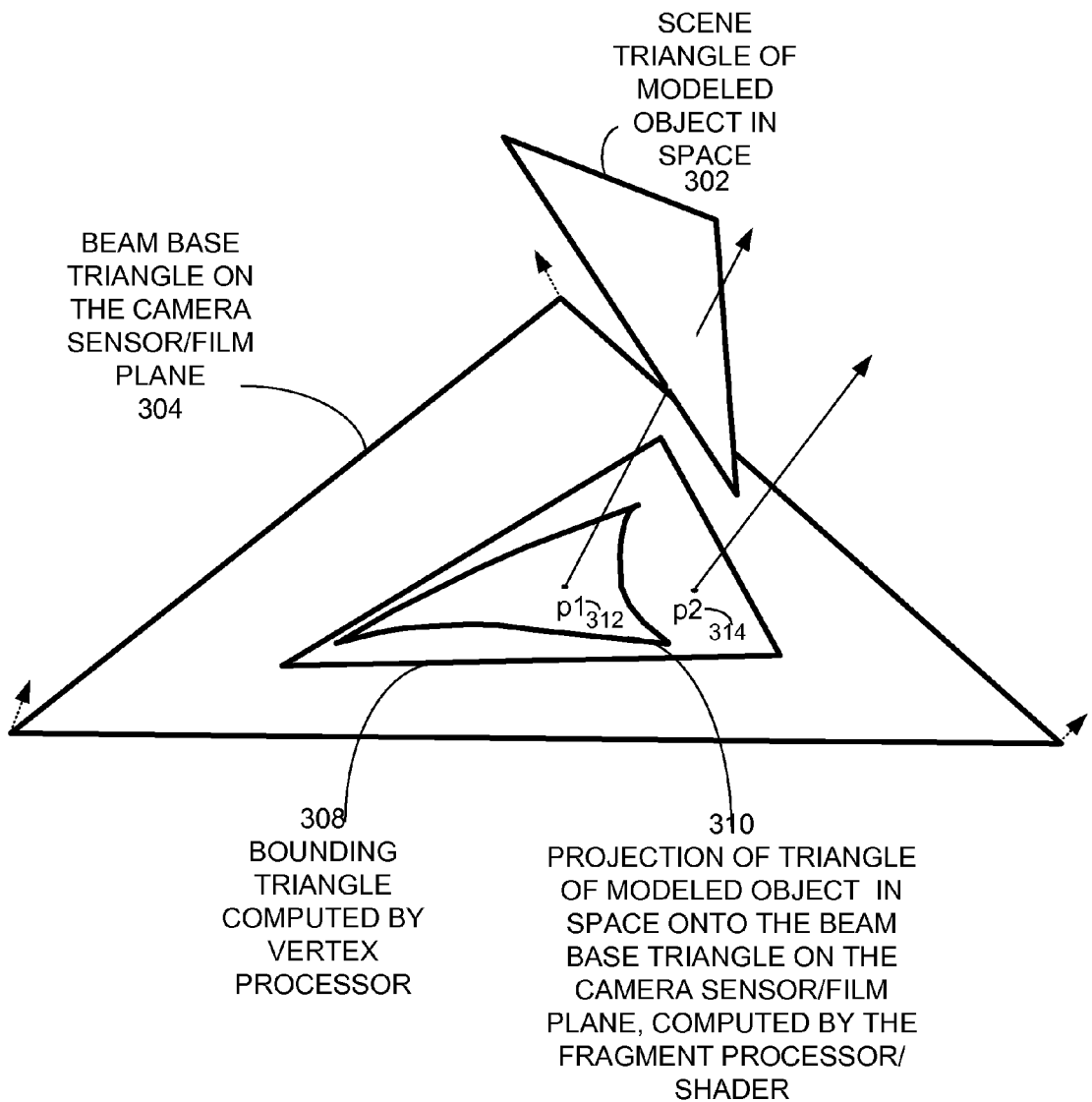
FIG. 3 is an example of beam tracing for one scene triangle using the non-linear beam tracing technique.

One embodiment of the non-linear beam tracing technique renders scene triangles one by one via feed-forward polygon rasterization. As illustrated in FIG. 3, due to the non-linear nature of the beams, straight edges of a triangle might project onto curves on the beam base plane and the triangle might project onto multiple and/or non-triangular components. Such a non-linear projection cannot be directly achieved by a conventional linear graphics pipeline. Instead, in one embodiment of the technique, a non-linear graphics pipeline is implemented on a GPU by customizing both the vertex 214 and fragment modules 224 as follows. For each scene triangle 302, the vertex program 214 estimates a bounding triangle 308 that properly contains the projected region of the scene triangle on the beam base plane 310. This bounding triangle 308 is then passed down to the rasterizer 222. Note that even though the projected region 310 may contain curved edges or even multiple components, the bounding triangle 308 possesses straight edges so that it can be rasterized as usual. For each pixel within the bounding triangle, the fragment module 224 performs a simple ray-triangle intersection test to determine if it is within the true projection; if so, the pixel is shaded, otherwise, it is discarded via fragment kill.

More specifically, FIG. 3 depicts the rendering of one scene triangle within one beam. The scene triangle 302 is projected onto the beam base triangle of the camera sensor/film plane 304. Due to non-linear projection of the scene triangle 302, the projected region 306 may have curved edges. The rendering is performed by a combination of the previously discussed programmable vertex processor 214 that estimates the bounding triangle 308, and the fragment processor 224 that shades and determines if each bounding triangle pixel is within the true projection of the scene triangle 302. In this example, $p_1$ 312 lies within the true projection but not $p_2$ 314.

Rendering results for each beam are stored as a texture on its base triangle. The collection of beam base triangles is then texture mapped onto the original reflector/refractor surfaces (e.g., textures 208) for final rendering. For clarity, the collection of beam base triangles corresponding to a single reflector/refractor object is called a BT (beam tracing) mesh. The resolution of the BT mesh trades off between rendering quality and speed. A BT mesh is associated with a reflector/refractor interface through either mesh simplification or procedural methods, depending on whether the interface is static (e.g. a mirror teapot) or dynamic (e.g. water waves).

1.3 Exemplary Processes

Figure 4:
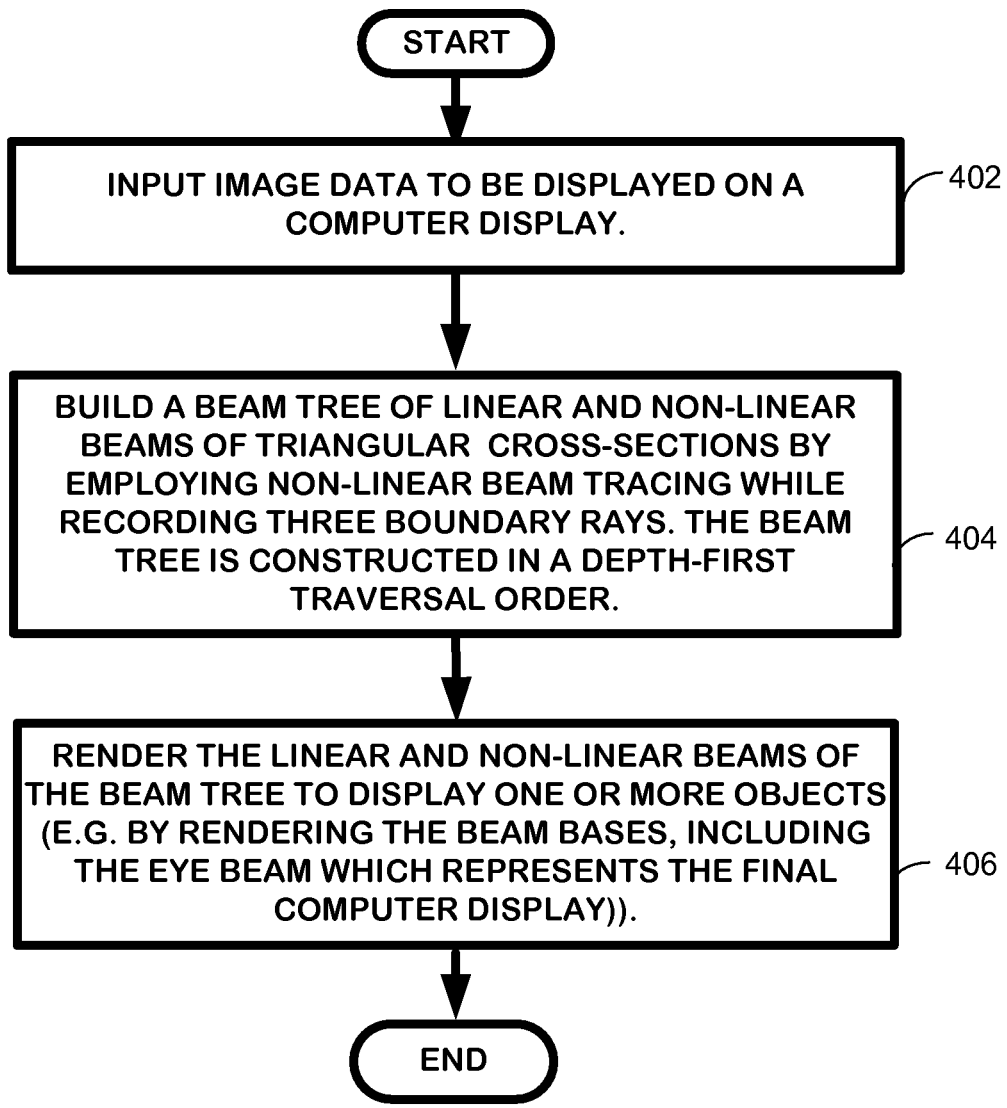
FIG. 4 is a flow diagram depicting a generalized exemplary embodiment of a process employing one embodiment of the non-linear beam tracing technique.

FIG. 4 depicts an exemplary flow diagram of an exemplary process employing the non-linear beam forming technique.

In this embodiment of the technique, image data of a scene or object to be displayed on a computer display is input (box 402). A beam tree of linear and non-linear beams of triangular cross-sections is built by employing non-linear beam tracing while recording three boundary rays for each beam (box 404). The beam tree has nodes which represent beams of light and links which represent the parent-child relationships among these beams. The beam tree is preferably constructed in a depth-first traversal order (e.g., starting at the root). The linear and non-linear beams are then rendered in a depth-first order according to the beam tree, and the final beam rendered, corresponding to the eye beam, produces the final image on the computer display (box 406).

Figure 5:
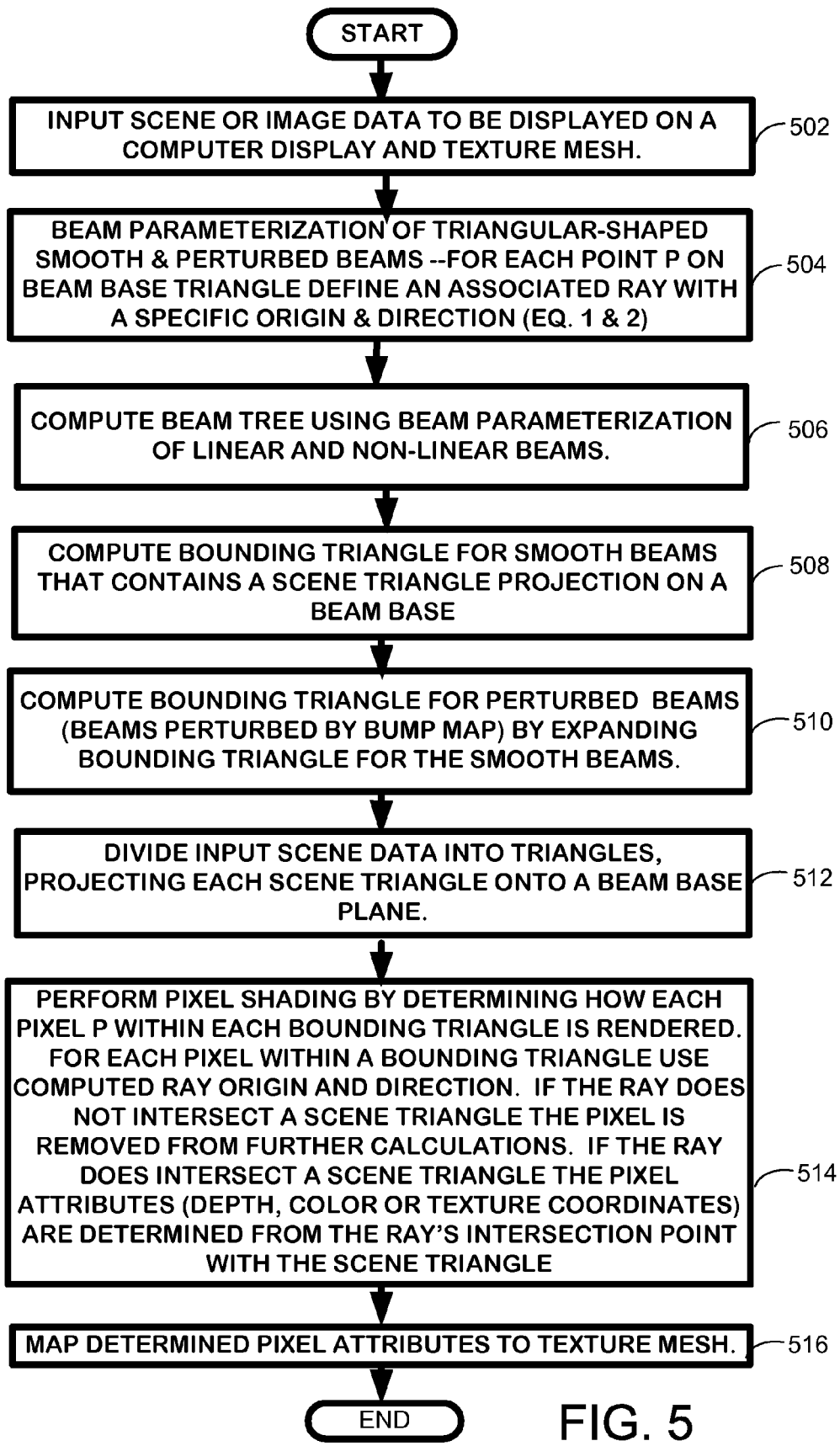
FIG. 5 is a flow diagram depicting another exemplary embodiment of a process employing one embodiment of the non-linear beam tracing technique.

FIG. 5 depicts another flow diagram of an exemplary process employing one embodiment of the non-linear beam forming technique to display image or scene data on a computer display. Scene data or image data of an object to be displayed on a computer display and a texture mesh are input (box 502). Beam parameterization of triangular-shaped smooth and perturbed beams is computed (e.g. for each point P on the beam base triangle of the beam an associated ray with a specific origin and direction is computed (this can be done using equations 1 and 2 to be discussed in Section 1.4.1) (box 504). A beam tree is computed using the beam tree parameterization of linear and non-linear beam (box 506). After the beam tree is built, the beams are rendered as follows. The scene or image data is divided into scene triangles (box 512). For each scene triangle, a bounding triangle is computed for each smooth beam (box 508). A bounding triangle for perturbed beams (e.g. beams perturbed by a bump map) is then computed by expanding the bounding triangle as calculated for a smooth beam (box 510). Pixel shading is then performed by determining how each pixel P within the bounding triangle is rendered. For each pixel within each bounding triangle the previously computed ray origin and direction are used. If the ray does not intersect a scene triangle the pixel is removed from further calculations. If the ray does intersect a scene triangle, the pixel attributes (depth, color or texture coordinates) are determined from the ray's intersection point with the scene triangle and these attributes at the ray's intersection with the scene triangle are used to render the pixel (box 514). The pixel results for each beam are stored as a texture and then mapped onto the texture map during rendering (box 516).

An exemplary architecture and process employing the non-linear beam tracing technique having been discussed the following paragraphs provide details.

1.4 Technique Details and Alternate Embodiments

An overview of one embodiment of the non-linear beam tracing technique is summarized in Table 1. The steps of the technique described in Table 1 are cross-correlated to the flow chart shown in FIG. 4. Details follow in the sections below.

TABLE 1

Process Overview of One Embodiment of the Non-Linear Beam Tracing Technique.

function Non-linearBeamTracing( )
$B_0 \leftarrow$ eye beam from viewing parameters
$\{B_{ij}\} \leftarrow$ BuildBeamTree($B_0$)//on CPU or GPU (boxes 402, 404 of FIG. 4)
//i indicates depth of beam tree with j labels nodes in level i
for each (i,j) in depth first order
   RenderBeam ($B_{ij}$)//on GPU (box 406 of FIG. 4)
end for
function $\{B_{ij}\} \leftarrow$ BuildBeamTree($B_0$) (boxes 402, 404 of FIG. 4)
   trace beam shapes recursively allowing non-linear beams to bounce off of curved surfaces
   record boundary rays $\{\vec{d_{ijk}}\}_{k=1,2,3}$ for each $B_{ij}$
function RenderBeam (B) (box 406 of FIG. 4)
   if perturbation required //bump map or other sources
     perturb rays in B TABLE 1-continued Process Overview of One Embodiment of the Non-Linear Beam Tracing Technique.

```
    δ ← maximum angular deviation of B from original (smooth)
        beam parameterization
    else
    δ ← 0
    end if
    for each scene triangle Δ
        Δ̃ ← Bounding Triangle (Δ, B, δ )//vertex shoulder
        RenderTriangle(Δ̃, Δ, B)// fragment shader
    end for
```

As shown in FIG. 4 and Table 1, the non-linear beam tracing framework of one embodiment of the technique is divided into two major parts: building a beam tree a on CPU or GPU (boxes 402, 404 of FIG. 4), and rendering the beams on GPU (as illustrated in Non-linearBeamTracing( ) portion of Table 1 and box 406 of FIG. 4). In one embodiment of the technique the beams have triangular cross sections and three boundary rays associated with each beam are computed and recorded (as illustrated in the BuildBeamTree( ) portion of Table 1 and shown in FIG. 4, box 404).

The following paragraphs provide details regarding the previously discussed process actions.

1.4.1 Beam Parameterization

As previously described with respect to FIG. 4, boxes 402, 404 and Table 1, in one embodiment of the technique, beams with triangular cross sections are employed for easy processing. For each point $\vec{P}$ on the beam base triangle, the beam parameterization defines an associated ray with a specific origin and direction. The beam parameterization for ray origins and directions has the following characteristics: (1) the vertex values can be interpolated, (2) edge values of the triangles depend only on the two adjacent vertices, (3) $C^0$ continuity ($C^n$ continuity means that the function values are continuous up to the nth derivative, so $C^0$ continuity simply means that the function values are continuous and specifically there are no sudden jumps.) exists across adjacent beams to ensure pattern continuity, (4) no excessive undulations occur inside each beam, (5) the beam parameterization is easy to compute on a per pixel basis for efficient fragment program execution, and (6) it allows for easy bounding triangle estimation for efficient vertex program execution. Two types of parameterizations are employed in one embodiment of the technique: a smooth parameterization for coherent beams and a bump-map parameterization for perturbed beams.

More specifically, given a beam B with normalized boundary rays $\{\vec{d}_1, \vec{d}_2, \vec{d}_3\}$ defined on three vertices of its base triangle $\Delta P_1 P_2 P_3$, the smooth parameterization of the ray origin and direction for any point P on the beam base plane is defined via the following formula:

$$\vec{O} = \sum_{i+j+k=n} \overline{a_{ijk}} \omega_1^i \omega_2^j \omega_3^k \text{ (ray origin)} \quad (1)$$

$$\vec{d} = \sum_{i+j+k=n} \overline{b_{ijk}} \omega_1^i \omega_2^j \omega_3^k \text{ (ray direction)}$$

$$\omega_i = \frac{\text{area}(\Delta P_i P_j P_k)}{\text{area}(\Delta P_1 P_2 P_3)_{i=1,2,3, j=(i \bmod 3)+1, k=(i \bmod 3)+2}}$$

$$\overline{a_{ijk}} = \overline{L_{ijk}}(\overline{P_1}, \overline{P_2}, \overline{P_3})$$

$$\overline{b_{ijk}} = \overline{L_{ijk}}(\overline{d_1}, \overline{d_2}, \overline{d_3})$$

where $\vec{L}$ is a function satisfying the following linear property for any real number s, $\{\vec{P}_1, \vec{P}_2, \vec{P}_3\}$, and $\{\vec{d}_1, \vec{d}_2, \vec{d}_3\}$:

$$\vec{L}(\overline{P_1} + s\overline{d_1}, \overline{P_2} + s\overline{d_2}, \overline{P_3} + s\overline{d_3}) = \vec{L}(\overline{P_1}, \overline{P_2}, \overline{P_3}) + s\vec{L}(\overline{d_1}, \overline{d_2}, \overline{d_3}) \quad (2)$$

This formulation is termed as the $S^n$ parameterization, the beam parameterization for a smooth beam (where $\vec{L}$ contains $$\left\{ \frac{n!}{i! j! k!} \right\}_{i+j+k=n}$$

terms). Note that this is an extension of the computation of triangular Bezier patches with two additional constraints: (1) the identical formulations of $\overline{a_{ijk}}$ and $\overline{b_{ijk}}$ in Equation 1, and (2) the linear property for $\vec{L}$ as in Equation 2. These are essential for an efficient GPU implementation. Even with these two restrictions, the $S^n$ parameterization is still general enough to provide desired level of continuity. Note that in general $\vec{O} \neq \vec{P}$ unless under the $C^0$ parameterization.

$$\vec{O} = \omega_1 \overline{P_1} + \omega_2 \overline{P_2} + \omega_3 \overline{P_3} = \vec{P} \quad (3)$$

$$\vec{d} = \omega_1 \overline{d_1} + \omega_2 \overline{d_2} + \omega_3 \overline{d_3}$$

Even though in theory general $C^k$ continuity might be achieved via a large enough n in the $S^n$ parameterization, it has been found out through experiments that an excessively large n not only slows down computation but also introduces excessive undulations. The tradeoff between $C^0$ and $S^3$ ($S^n$ mentioned above with n equals to 3) parameterizations is that $C^0$ is faster to compute (both in vertex and pixel programs) but $S^3$ offers higher quality as it ensures $C^1$ continuity at BT mesh vertices. This quality difference is most evident for scene objects containing straight line geometry or texture.

For perturbed beams, $\vec{d}$ and $\vec{O}$ are computed via the $C^0$ parameterization followed by standard bump mapping. Due to the nature of perturbation it has been found a parameterization with higher level continuity unnecessary. For efficient implementation and ease of computation, it is assumed that all rays $\{\vec{d}_1, \vec{d}_2, \vec{d}_3\}$ point to the same side of the beam base plane. The exception happens only very rarely for beams at grazing angles. This is enforced in one implementation by proper clamping of $\{\vec{d}_1, \vec{d}_2, \vec{d}_3\}$.

1.4.2 Shading

In this section how one embodiment of the fragment module (FIG. 2, 224) renders each point $\vec{P}$ within the bounding triangle $\tilde{\Delta}$ is computed by the vertex module (FIG. 2, 214) is described. As previously discussed, for each point $\vec{P}$, first its ray origin $\vec{O}_P$ and direction $\vec{d}_P$ is computed via Equation 1 (followed by a bump map computation if necessary) (FIG. 5, box 504). Then a simple ray-triangle intersection between the ray ($\vec{O}_P, \vec{d}_P$) and the scene triangle is performed. If the ray does not intersect the scene triangle, the pixel associated with $\vec{P}$ is immediately removed from further processing. Otherwise, its attributes (depth, color, or texture coordinates) are determined from the intersection point $\vec{Q}$ and $\vec{P}$ is shaded followed by frame-buffer write with hardware z-test (FIG. 5, boxes 514, 516). From now on, it is said that a scene point $\vec{Q}$ has a projection $\vec{P}$ on beam base $\Pi_b$ if there exists a real number t so that $\vec{Q} = \vec{O_P} + t\vec{d_P}$. In the bounding triangle estimation procedure below, a related operation termed transfer that is defined as follows is employed. A scene point $\vec{Q}$ has a transfer $\vec{P}$ on a plane $\Pi_b$ in the direction $\vec{d}$ if there exists a real number t so that $\vec{Q} = \vec{P} + t\vec{d}$. In other words, unlike projection, transfer is a pure geometric operation and has no association with beam parameterization.

1.4.3 Bounding Triangle Estimation

In this section, as previously discussed with respect to FIG. 4, box 406 and Table 1, one embodiment of the bounding triangle estimation procedure as implemented in the programmable vertex module is described. The bounding triangle procedure should satisfy two goals simultaneously: (1) it should be easily computed to provide for a fast/short vertex program and (2) it should create a tight bounding region for a low pixel overdraw ratio. The pixel overdraw ratio is defined as the relative number of pixels of the bounding triangle over the projected area. Since a typical GPU has two main execution stages, the procedure was designed to properly balance the workload between vertex and fragment stages. However, the performance improvement remains even if the technique is implemented in a unified shader architecture.

In the following paragraphs, the bounding triangle computation for S" ($\delta$=0) and bump-map ($\delta$>0) parameterizations is presented. The procedures performed rely on several math quantities: (1) external directions $\{\hat{d}_1, \hat{d}_2, \hat{d}_3\}$, which are expansions of the original beam directions $\{\vec{d}_1, \vec{d}_2, \vec{d}_3\}$ so that they "contain" all interior ray directions $\vec{d}$, (2) an affine plane $\Pi_a(t)$, which is t distances away from the beam base plane $\Pi_b$ and contains affine triangle $\Delta_a(t)$ with vertices $\vec{H}_i = \vec{P}_i + t\vec{d}_i$, i=1,2,3, (3) threshold plane $\Pi_T$, which is a special affine plane $\Pi_a(t_{res})$ with a particular value $t_{res}$ so that any space point $\vec{Q}$ above $\Pi_T$ is guaranteed to have at most one projection within the beam base triangle $\Delta P_1 P_2 P_3$, and (4) maximum offsets $\mu_b$ and $\mu_d$, which are maximum offsets between the S" and $C^0$ parameterizations of ray origin and direction for all $\vec{P}$ on the base triangle $\Delta_b$. Appendix A provides more detailed mathematical definitions of these variables.

1.4.3.1 Bounding Triangle for Smooth Beam with S" Parameterization

In one embodiment of the non-linear beam tracing technique, for a S" beam parameterization as computed in Equation 1, the bounding triangle can be accurately estimated by computing tangent lines to each projected edge of the scene triangle. (For example, for $C^0$ parameterization all projected edges are quadratic curves.) However, this strategy has some drawbacks. First, since the projection region may have an irregular shape (for example, it may not be a triangle or even a single region), handling all these cases robustly can be difficult. Second, it was found through experimentation that it is too computationally expensive for vertex programs. Third, it is not general as different n values for S" typically require different algorithms. Instead, one embodiment of the non-linear beam tracing technique produces less tight bounding triangles than the aforementioned tangent line method but is more general (applicable to any S"), more robust (works for any projected shape), and faster to compute. For clarity, a procedure employed by one embodiment of the non-linear beam tracing technique for computing a bounding triangle for a smooth beam (as was previously discussed with respect to FIG. 5, box 508 and FIG. 2 modules 214, 216, 218) is delineated in Table 2. The paragraphs following Table 2 provide details for computing a bounding triangle for smooth beams and an expanded triangle for perturbed beams.

TABLE 2

Bounding Triangle Estimation for Smooth Beams function $\tilde{\Delta}$ ← BoundingTriangle( $\Delta$, B ,$\delta$ = 0 )
 $\{\hat{d}_i\}_{i=1,2,3}$ ← extremal rays of B
 $\{\vec{P}_i\}_{i=1,2,3}$ ← base vertices of B
 $\Pi_b$ ← base plane of B
$\Delta_b$ ← base triangle of B
 $\mu_b, \mu_d$ ← maximum offsets of B
 $\Pi_T$ ← threshold plane of B
//all quantities above are pre-computed per B
$\{\vec{Q}_i\}_{i=1,2,3}$ ← vertices of scene triangle $\Delta$
if $\{\vec{Q}_i\}_{i=1,2,3}$ not all inside or outside B
 //brute force case
 $\tilde{\Delta}$ ← entire base triangle of B
elseif $\Delta$ not above $\Pi_T$
 //general case
 for each i,j=1,2,3
  $P_{i,j}$ ← Transfer($\vec{Q}_i, \hat{d}_j, \Pi_b$ )
  $\tilde{\Delta}$ ← ExpandedBoundingTriangle ( $\{P_{ij}\}_{i,j=1,2,3}, \Delta_b$ )
else
 //unique projection case
 $\Pi_a$ ← affine plane of B passing through the top of $\Delta$
 $\Delta_a$ ← affine triangle on $\Pi_a$
 for each i,j=1,2,3
  $H_{ij}$ ← Transfer ($\vec{Q}_i, \hat{d}_j, \Pi_a$ )
  $\Delta E_1 E_2 E_3$ ← ExpandedBoundingTriangle ( $\{H_{ij}\}_{i,j=1,2,3}, \Delta_a$ )
  $\{\omega_k\}_{k=1,2,3}$ ← $\Omega(\{\vec{E}_i\}_{i=1,2,3}, \Delta_a)$ //barycentric coordinates
  $\{\vec{F}_i\}_{i=1,2,3}$ ← $\Omega^{-1}(\{\omega_k\}_{k=1,2,3}, \Delta_b)$
  $\tilde{\Delta}$ ← $\Delta F_1 F_2 F_3$
endif
function $\tilde{\Delta}_-$ ← ExpandedBoundingTriangle( $\{P_{ij}\}_{i,j=1,2,3}, \Delta_a$ )
 $\tilde{\Delta}$ ← BoundingTriangle( $\{P_{ij}\}_{i,j=1,2,3}$)
 $\Pi_a$ ← plane containing $\Delta_a$
 $\theta_{min}$ ← min(angle($\hat{d}_i, \Pi_a$),$\forall$i = 1,2,3)
t←the t value $\Delta_a$ relative to $\Delta_b$ expand $\tilde{\Delta}$ outward with distance $\varepsilon = \dfrac{\mu_b + t \mu_d}{\sin(\theta_{min})}$ More specifically, for each scene triangle $\Delta$ with vertices $\{\vec{Q}_i\}_{i=1,2,3}$ nine transfer points $\{P_{ij}\}_{i,j=1,2,3}$ on the beam base plane $\Pi_b$ are computed where $P_{i,j}$ is the transfer of $\vec{Q}_i$ in the direction of $\hat{d}_j$. A bounding triangle $\tilde{\Delta}$ is then computed from $\{P_{ij}\}_{i,j=1,2,3}$. This procedure only works for $C^0$ parameterization but one can extend it for the general S" (n>1) parameterization by replacing $\vec{d}_j$ with $\hat{d}_j$ followed by proper $\epsilon$-expansion of the bounding triangle $\tilde{\Delta}$ as described under ExpandedBoundingTriangle( ) in Table 2. (The amount of expansion $\epsilon$ is zero for $C^0$ paramaterization, and is non-zero for S" parameterization to ensure that $\tilde{\Delta}$ is conservative even when $\vec{O}_P \neq \vec{P}$.) This procedure is termed the general case as in Table 2. It can be shown that $\tilde{\Delta}$ computed above is guaranteed to be a bounding triangle for the projection of the scene triangle $\Delta$ as long its three vertices completely lie within the beam. However, the bounding triangle computed by this procedure is too crude; as the scene triangle gets smaller or further away from $\Pi_b$, the overdraw ratio can become astronomically large, making rendering of large scene models impractical.

Another embodiment of the non-linear beam tracing technique employs a different procedure to compute the bounding triangle as follows. The large overdraw ratio in the general case of the procedure only happens when the rays are diverging. The technique addresses this issue by first computing nine transfer points $\{H_{ij}\}_{i,j=1,2,3}$ and the associated bounding triangle $\Delta E_1 E_2 E_3$ similar to the general case procedure, but instead of the base plane $\Pi_b$ these computations are performed on an affine plane $\Pi_a$ that passes through the top of the scene triangle $\Delta$. (If there are multiple affine planes $\Pi_a(t)$ that pass through the top, one chooses the one with largest t value.) One then transports the vertices of $\Delta E_1 E_2 E_3$ on $\Pi_a$ to the vertices of $\Delta F_1 F_2 F_3$ on $\Pi_b$ so that they share identical barycentric coordinates. It can be proven that $\Delta F_1 F_2 F_3$ is guaranteed to be a proper bounding triangle as long the scene triangle $\Delta$ is above the threshold plane $\Pi_T$. Furthermore, since $\Pi_a$ is much closer to the scene triangle $\Delta$ than to the beam base plane $\Pi_b$, the bounding region is usually much tighter and thus the overdraw ratio is reduced. Since this procedure is faster than the general case procedure but works only when each space point $\vec{Q} \in \Delta$ A has at most one projection in the base triangle (due to the fact that $\Delta$ is above $\Pi_T$), it is termed the unique projection case procedure (i.e., finitescenebounding-box).

Since the unique projection case procedure is not guaranteed work when the scene triangle $\Delta$ is not above the threshold plane $\Pi_T$, in this case, the general case procedure is applied. Unlike the diverging case, the region below the threshold plane is mostly converging and the volume is bounded, so the overdraw ratio is usually small. The procedure also fails to be conservative when the three vertices of the scene triangle lie on different sides of the beam boundary. When this happens, the entire beam base is used as the bounding triangle. Since each frustum side of the beams is a bilinear surface for the $C^0$ parameterization, this frustum intersection test can be efficiently performed. (For the $S^3$ parameterization it is a bi-cubic surface and analogous strategies can be applied.) Furthermore, triangles that intersect the beam boundary are relatively rare so this brute force solution does not significantly affect the run-time performance.

1.4.3.2 Bounding Triangle for Perturbed Beam with Bump-Map Parameterization

As mentioned previously with respect to FIG. 5, boxes 508, 510, the bounding triangle for a perturbed beam is obtained by expanding the bounding triangle as computed for a smooth beam. More specifically, mathematically this can be described as follows. With a set of properly computed external directions $\{\hat{d}_i\}$, the general case procedure for $S''$ can be directly applied for bump map parameterization. However, since bump map pixels can point in arbitrary directions, the bump map parameterization defies general analysis of $\Pi_a$ and $\Pi_T$ as described for the $S''$ parameterization. Consequently, the unique projection case procedure is not applicable and rendering of bump mapped beams will be slow. To address this deficiency, a procedure can be employed that allows the technique to take advantage of the efficiency of the $S''$ bounding triangle procedure. First, the maximum perturbation angle $\delta$ formed by each ray and its unperturbed equivalent sharing the same origin as determined by the $C^0$ parameterization is pre-computed. Given a scene triangle $\Delta Q_1 Q_2 Q_3$, first its $C^0$ bounding triangle is computed via the $S''$ procedure. This $C^0$ bounding triangle is extended outward via a distance D computed via the following formula:

$$\tau = \delta + \varphi \quad (4)$$
$$\theta_1 = \arcsin(\min(\vec{n} \cdot \overrightarrow{d_{Q_1}}, \vec{n} \cdot \overrightarrow{d_{Q_2}}, \vec{n} \cdot \overrightarrow{d_{Q_3}}))$$
$$\theta_2 = \arcsin(\min(\vec{n} \cdot \vec{d_1}, \vec{n} \cdot \vec{d_2}, \vec{n} \cdot \vec{d_3}))$$

-continued $$\theta_3 = \theta_2 \text{ if } \theta_2 > \tau$$
$$\quad \theta_1 \text{ else if } \theta_1 > \tau$$
$$\quad \tau \text{ else}$$
$$D = \frac{\max(\|Q_i P_{ij}\|, \forall i, j = 1, 2, 3) \cdot \sin\tau}{\sin(\theta_3 - \tau)}$$

where $\phi$ is the maximum angle formed between any two rays within the same beam, $\vec{n}$ is the normal of the beam base (facing the inside of the beam), $$\overrightarrow{d_{Q_i}} = \frac{\vec{Q_i} - \overrightarrow{P_{Q_i}}}{\|\vec{Q_i} - P_{Q_i}\|}$$

with $\overrightarrow{P_{Q_i}}$ being the un-perturbed projection of $\vec{Q_i}$, $\vec{d_i}$ the direction at $\vec{P_i}$, and $\vec{P_{ij}}$ the transfer of $\vec{Q_i}$ at direction $\vec{d_j}$ (as in the $S''$ bounding triangle procedure). Intuitively, this procedure extends the original $C^0$ bounding triangle by an amount D so that to cover all shifted projection locations caused by bump maps. Note that obtaining $\{\overrightarrow{P_{Q_i}}\}_{i=1,2,3}$ requires solving three cubic polynomials; fortunately, this is only needed when $\theta_2 \leq \tau$, a rare condition in practical situations.

1.4.4 Beam Tracing (BT) Mesh Construction

For a static reflector/refractor, the technique builds a beam tracing mesh by summing the beam base triangles corresponding to a single refractor/reflector objects. Various methods of mesh simplification can be used to reduce the polygon counts of the original texture mesh to a smaller number of polygon counts while still preserving the overall shape of the mesh. One embodiment of the technique employs a procedural method to ensure real-time performance. For example, water waves are often simulated in games via a planar base mesh with procedural, sinusoidal-like vertex motions plus further mesh subdivision for rendering. In one embodiment of the technique a base mesh is used as the beam tracing mesh and the texture-map of the beam tracing results are mapped back onto the subdivided mesh. Similar strategies could be applied for other kinds of simulation techniques in games and interactive applications.

1.4.5 Beam Tree Construction

A discussed previously with respect to FIG. 3 and Table 1, a beam tree is built. Beam tree construction is similar to prior methods of constructing a beam tree, however, instead of using only linear beams, non-linear beams are employed in the beam tree. For each primary beam B that interacts with a secondary beam with base triangle $\Delta Q_1 Q_2 Q_3$, projection direction(s) $\{\vec{d}_{ij}\}$ are computed for each $\vec{Q_i}$ with respect to B. In doing so it is necessary to deal with general non-linear beam interactions which may cause multiple values for $\{\vec{d}_{ij}\}$. The reason behind this is simple. Similar to the diverse situations that might happen when a scene triangle is projected onto a non-linear beam, a secondary beam vertex $\vec{Q}$ might also have multiple projections onto the primary beam B.

To handle these situations, in one embodiment, the technique employs a beam construction procedure as summarized in Table 3. In general, the beam tracing method culls beam components outside the beam base triangle and clips those crossing the bounding triangle borders. More specifically, in one embodiment, given a primary beam B and a secondary beam base triangle $\Delta Q_1 Q_2 Q_3$ (beam base triangle of a beam caused by reflection or refraction), the technique first computes the projections $\{V_{ij}\}$ of each $\vec{Q_i}$ onto B. The projections $\{V_{ij}\}$ correspond to vertices of the components of the projection regions from $\Delta Q_1 Q_2 Q_3$. The technique groups $\{V_{ij}\}$ into disjoint components $\{R_k\}$, culls those outside the base triangle $\Delta_b$ of B, and clips those crossing the boundary of $\Delta_b$. The technique then handles each remaining $R_k$ separately. In the benign case where $R_k$ (1) has exactly three vertices and (2) is not clipped, it can be shown that (1) each $\vec{Q_i}$ has a unique projection $V_i$ corresponding to one of the vertices of $R_k$ and (2) $R_k$ corresponds to the entire $\Delta Q_1 Q_2 Q_3$. Consequently the projection direction $\vec{d_i}$ of $\vec{Q_i}$ can be computed from $V_i$ relative to the primary beam B. In complex cases where $R_k$ either (1) has number of vertices other than three or (2) is clipped, it could happen that (1) at least one $\vec{Q_i}$ projects onto multiple vertices of $R_k$ and consequently has multiple directions $\vec{d_{i,j}}$ defined or (2) $R_k$ corresponds to a curved subset of $\Delta Q_1 Q_2 Q_3$. In these cases, the technique represents $\Delta Q_1 Q_2 Q_3$ with multiple beams $\{B'\}$ so that each one of them has uniquely defined directions over the corresponding beam base vertices. The technique achieves this by triangle-stripping $R_k$ into multiple components $\{R_{km}\}$ so that each $\vec{Q} \in \Delta Q_1 Q_2 Q_3$ has at most one projection within each $R_{km}$, and handle $R_{km}$ via the benign case procedure.

Since the eye-beam is single-perspective, all of the secondary beams (for first level reflections and refractions) belong to the benign cases and the more complicated cases can arise only for third or higher level beams. Additionally, the technique clips the disjoint components $R_k$ against the boundary of the bounding triangle $\Delta_b$, so it guarantees consistency across multiple primary beams via the vertices created through clipping, e.g. when $\Delta Q_1 Q_2 Q_3$ projects onto the bases of two adjacent primary beams. Finally, since each $R_{km}$ corresponds to a subset of $\Delta Q_1 Q_2 Q_3$, this beam splitting process does not require re-building of beam tracing meshes or the associated textures as each new beam can be rendered into a subset of the original texture atlases. Since beam tracing meshes are coarser than the real reflector/refractor geometry, the technique can trace beam shapes entirely on a CPU.

TABLE 3

Beam Construction

```
function {B'} ← ConstructBeams(ΔQ₁Q₂Q₃, B )
//ΔQ₁Q₂Q₃ ← secondary beam base triangle
//B ← primary beam
//{(B'} ← secondary beams from reflections or refractions
(B'} ← emptyset
foreach i=1,2,3
        {V_{i,j}} ← Project(Q̄_i, B)
    group{V_{ij}}_{i=1,2,3} into disjoint regions {R_k}
    cull and clip{R_k} against beam base triangle Δ_b of B
    foreach R_k
        if # vertices of R_k equals 3 and R_k not clipped
            // each Q̄_i has unique V_i ∈ R_k and hence unique d̄_i
            B'← beamwithbase ΔQ₁Q₂Q₃ and directions {d̄_i}
            add B' to{B'}
        else // some Q̄_i may have multiple directions {d̄_{ij}}
            triangle-strip R_k into multiple regions {R_{km}} so that each
            Q̄ ∈ ΔQ₁Q₂Q₃ has at most one projection within each R_{km}
            handle each R_{km} as the "if" case above
        end if
    endfor
```

1.4.6 Texture Storage for Multiple Bounces

For single-bounce beam tracing the non-linear technique simply records the rendering results over a texture map parameterized by a beam tracing mesh. However, for multibounce situations (e.g. multiple mirrors reflecting each other), one texture map might not suffice as each beam base triangle might be visible from multiple beams. For the worst case scenario where M beams can all see each other, the number of different textures can be $O(M^n)$ for n-bounce beam tracing. Fortunately, it can be easily proven that the maximum amount of texture storage is $O(Mn)$ if the beam tree is rendered in a depth-first order. In one embodiment the technique simply keeps n copies of texture for each beam for n-bounce beam tracing.

1.4.7 Acceleration

Given M scene triangles and N beams, the technique would require O(MN) time complexity for geometry processing. Fortunately, this theoretical bound on computation speed can be reduced in practice by view frustum culling and level of detail (LOD) control, as discussed below.

1.4.7.1 Frustum Culling

The viewing frustum is the field of view of the notional camera. The exact shape of this region varies depending on what kind of camera lens is being simulated, but typically it is a frustum of a rectangular pyramid. The planes that cut the frustum perpendicular to the viewing direction are called the near plane and the far plane. Objects that are closer to the camera than the near plane or are further than the far plane are not drawn. View frustum culling is the process of removing objects that lie completely outside the viewing frustum from the rendering process. For a linear view frustum, culling can be efficiently performed since each frustum side is a plane. However, in one embodiment of the technique, each beam has a non-linear view frustum where each frustum side is a non-planar surface. Furthermore, for beam bases lying on a concave portion of the reflector the three boundary surfaces might intersect each other, making the sidedness test of traditional culling incorrect. To resolve these issues, one embodiment of the non-linear beam tracing technique adopts a simple heuristic via a cone which completely contains the original beam viewing frustum. In the one implementation of the technique computation of the bounding cones and culling operations are performed per object on a CPU as well as per triangle on a GPU. Portions of objects outside the bounding cone are culled. Details of how this culling is performed and the associated mathematical computations are provided in Appendix A.5.

1.4.7.2 Geometry (Level of Detail) LOD Control

In computer graphics, accounting for level of detail involves decreasing the complexity of a 3D object representation as it moves away from the viewer or according other metrics such as object importance, eye-space speed or position. Geometry level of detail (LOD) can be naturally achieved by the non-linear beamforming technique. In one embodiment, the technique estimates the proper LOD for each object when rendering a particular beam. This not only reduces aliasing artifacts but also accelerates the rendering speed. Geometry LOD is more difficult to achieve for ray tracing as it requires storing additional LOD geometry in the scene database. In one current implementation, the technique uses a simple heuristic by projecting the bounding box of an object onto a beam, and utilize the rasterized projection area to estimate proper LOD.

1.4.8 Anti-Aliasing

Anti-aliasing is the technique of minimizing the distortion artifacts known as aliasing when representing a high-resolution signal at a lower resolution. Anti-aliasing can be efficiently performed by the GPU in every major step of the non-linear beamforming technique. In addition to the geometry LOD control as mentioned above, the technique also performs full screen anti-aliasing for each rendered beam. The computed beam results are stored in textures, which in turn are anti-aliased via standard texture filtering.

2.0 The Computing Environment

The non-linear beam tracing technique is designed to operate in a computing environment. The following description is intended to provide a brief, general description of a suitable computing environment in which the non-linear beam tracing technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 6:
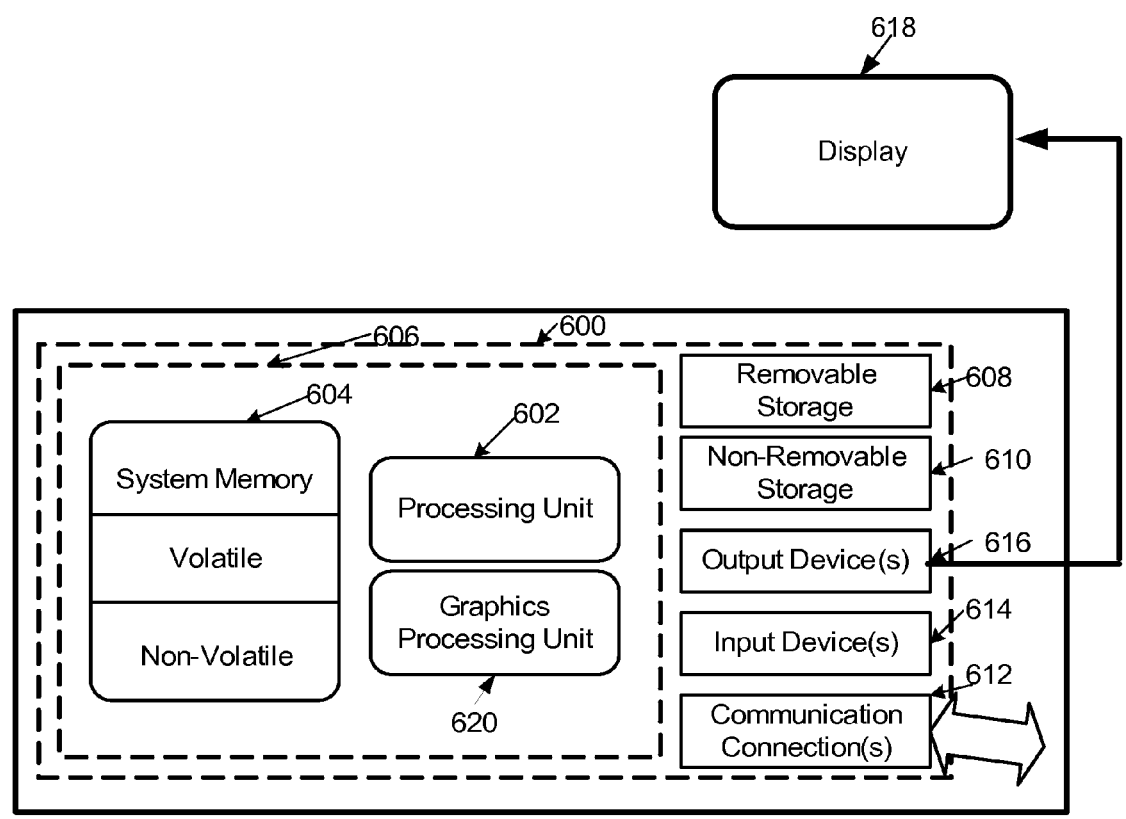
FIG. 6 is a schematic of an exemplary computing device in which the present non-linear beam tracing technique can be practiced.

FIG. 6 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 6, an exemplary system for implementing the non-linear beam tracing technique includes a computing device, such as computing device 600. In its most basic configuration, computing device 600 typically includes at least one processing unit 602 and memory 604. The computing device 600 also has a graphics processing unit 620 to aid in accelerating graphics rendering, among other functions. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606. Additionally, device 600 may also have additional features/functionality. For example, device 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 600. Any such computer storage media may be part of device 600.

Device 600 has a display 618, and may also contain communications connection(s) 612 that allow the device to communicate with other devices. Communications connection(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 600 may have various input device(s) 614 such as a keyboard, mouse, pen, camera, touch input device, and so on. Output device(s) 616 such as speakers, a printer, and so on may also be included. All of these devices are well known in the art and need not be discussed at length here.

The non-linear beam tracing technique may be described in the general context of computer-executable instructions, such as program modules, being executed by a computing device. Generally, program modules include routines, programs, objects, components, data structures, and so on, that perform particular tasks or implement particular abstract data types. The non-linear beam tracing technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. For example, one embodiment of the non-linear beam tracing technique can create higher accuracy models of reflections and refractions by using finer beams at the expense of more computations. Additionally, some of the processing that occurs on the CPU can be performed on the GPU and vice versa. The specific features and acts described above are disclosed as example forms of implementing the claims.

Appendix A. Detailed Mathematical Definitions

A.1 $S^3$ Parameterization

The formula for $S^3$ is:

$$\overrightarrow{L_{ijk}}(\overline{X_1}, \overline{X_2}, \overline{X_3}) = \frac{3!}{i!j!k!} \overrightarrow{c_{ijk}}(\overline{X_1}, \overline{X_2}, \overline{X_3})$$

$$\overrightarrow{c_{300}} = \overline{X_1}, \overrightarrow{c_{030}} = \overline{X_2}, \overrightarrow{c_{003}} = \overline{X_3}$$

$$w_{ij} = (\overline{X_j} - \overline{X_i}) \cdot \vec{n_i}; \vec{n_i} \text{ indicates normal at } \vec{P_i}$$

$$\overrightarrow{c_{210}} = (2\overline{X_1} + \overline{X_2} - w_{12}\vec{n_1})/3$$

$$\overrightarrow{c_{120}} = (2\overline{X_2} + \overline{X_1} - w_{21}\vec{n_2})/3$$

$$\overrightarrow{c_{021}} = (2\overline{X_2} + \overline{X_3} - w_{23}\vec{n_2})/3$$

$$\overrightarrow{c_{012}} = (2\overline{X_3} + \overline{X_2} - w_{32}\vec{n_3})/3$$

$$\overrightarrow{c_{102}} = (2\overline{X_3} + \overline{X_1} - w_{31}\vec{n_3})/3$$

$$\overrightarrow{c_{201}} = (2\overline{X_1} + \overline{X_3} - w_{13}\vec{n_1})/3$$

-continued $$\vec{e} = (\vec{c_{210}} + \vec{c_{120}} + \vec{c_{021}} + \vec{c_{021}} + \vec{c_{102}} + \vec{c_{201}})/6$$

$$\vec{v} = (\overline{X_1} + \overline{X_2} + \overline{X_3})/3$$

$$\vec{c_{111}} = \vec{e}(\vec{e} - \vec{v})/2$$

It can be easily shown that this formulation satisfies Equations 1 and 2.

A.1 External Directions $\{\hat{d}_i\}_{i=1,2,3}$

Given a beam B with base triangle $\Delta P_1 P_2 P_3$, its external directions is a set of ray directions $\{\hat{d}_1, \hat{d}_2, \hat{d}_3\}$ emanating from $\{P_1, P_2, P_3\}$ so that for each P within $\Delta P_1 P_2 P_3$ there exists a set of real numbers $\hat{\omega}_1, \hat{\omega}_2, \hat{\omega}_3, 0 \leq \hat{\omega}_1, \hat{\omega}_2, \hat{\omega}_3$ and $\hat{\omega}_1 + \hat{\omega}_2 + \hat{\omega}_3 = 1$ that can express $\vec{d}(P)$ as follows:

$$\vec{d}(P) = \hat{\omega}_1 \hat{d}_1 + \hat{\omega}_2 \hat{d}_2 + \hat{\omega}_3 \hat{d}_3$$

External directions exist as long all the beam directions point away to the same side of the beam base plane. Note that for $C^0$ parameterization one could have $\hat{d}_i = \vec{d}_i$, but this is not true for general $S^n$ parameterization and bump mapped surfaces. External directions can be computed analytically for $S^n$ parameterization and from the maximum perturbation angle $\delta$ for bump map parameterization.

A.2. Affine plane $\Pi_a$

Given a beam B with base triangle $\Delta P_1 P_2 P_3$ and associated rays $\{\vec{d}_1, \vec{d}_2, \vec{d}_3\}$, one defines affine triangle $\Delta_a(t)$ as a triangle $\Delta H_1 H_2 H_3$ where $\vec{H}_i = \vec{P}_i + t\vec{d}_i$, for a real number t. Note that an affine triangle is uniquely defined by the value t. Define affine plane $\Pi_a(t)$ as a plane which contains the affine triangle $\Delta_a(t)$. Note that the base plane of B is a special case of affine plane with t=0. Affine planes have this nice property that if $\vec{H} \in \Pi_a$ has the same set of barycentric coordinates as $\vec{P} \in \Pi_b$, then $\vec{P}$ is a projection of $\vec{H}$ on $\Pi_b$.

A.3 Threshold Plane $\Pi_T$

The threshold plane $\Pi_T$ of a beam B is defined as an affine plane $\Pi_a(t_{res})$ with a particular value $t_{res}$ so that any space point $\vec{Q}$ above $\Pi_T$ is guaranteed to have at most one projection within the beam base triangle $\Delta P_1 P_2 P_3$. Intuitively, the beam frustum above the threshold plane $\Pi_T$ has diverging ray directions. The threshold plane for the $S^n$ parameterization (Equation 1) is now defined. Let $\vec{P}_{i,t} = \vec{P}_i + t\vec{d}_i$, i=1,2,3. Define the following three quadratic functions $$f_1(t) = (\vec{P}_{2,t} - \vec{P}_{1,t}) \times (\vec{P}_{3,t} - \vec{P}_{1,t}) \cdot \vec{d}_1$$

$$f_2(t) = (\vec{P}_{3,t} - \vec{P}_{2,t}) \times (\vec{P}_{1,t} - \vec{P}_{2,t}) \cdot \vec{d}_2$$

$$f_3(t) = (\vec{P}_{1,t} - \vec{P}_{3,t}) \times (\vec{P}_{2,t} - \vec{P}_{3,t}) \cdot \vec{d}_3$$

Solving the three equations separately $f_1(t) = f_2(t) = f_3(t) = 0$ one obtains a set of (at most 6) real roots $\Im$. Denote $t_{max} = \max(0, \Im)$. The threshold plane $\Pi_T$ is then defined as the affine plane $\Pi_a(t_{res})$ so that $\min(\|\vec{P}_{res} - \vec{P}_{max}\|, \forall \vec{P}_{res} \in \Delta_a(t_{res}),$ $\vec{P}_{max} \in \Delta_a(xt)) > \mu_b + t_{max} \mu_d$ ($\mu_b$ and $\mu_d$ are defined in the equation below for maximum offsets. Note that $\Pi_a(t_{res})$ always exists as long $t_{res}$ is large enough.

A.4 Maximum Offsets $\mu_b$ and $\mu_d$

One defines $\mu_b$ and $\mu_d$ as the maximum offsets between the $S^n$ and $C^0$ parameterizations of ray origin and direction for all $\vec{P}$ on the base triangle $\Delta_b$:

$$\mu_b = \max\left(\left\|\vec{O_P} - \sum_{i=1}^{3} \omega_i \vec{P}_i\right\|, \forall \vec{P} \in \Delta_b\right)$$

$$\mu_d = \max\left(\left\|\vec{d_P} - \sum_{i=1}^{3} \omega_i \vec{d}_i\right\|, \forall \vec{P} \in \Delta_b\right)$$

where $\vec{O_P}$ and $\vec{d_P}$ are ray origin and direction computed according to the $S^n$ parameterization, $$\sum_{i=1}^{3} \omega_i \vec{P}_i \text{ and } \sum_{i=1}^{3} \omega_i \vec{d}_i$$

are same quantities computed via the $C^0$ parameterization, and $\{\omega_i\}_{i=1,2,3}$ are the barycentric coordinates of $\vec{P}$ with respect to $\Delta_b$. Since the $S^n$ parameterizations are just polynomials, $\mu_b$ and $\mu_d$ can be calculated by standard optimization techniques.

A.5 Bounding Cone for Frustum Culling

The cone center $\vec{P}_C$, direction $\vec{d}_C$, and angle $\theta_C$ are computed as follows:

$$\vec{d}_C = \frac{(\hat{d}_1 + \hat{d}_2 + \hat{d}_3)}{\|(\hat{d}_1 + \hat{d}_2 + \hat{d}_3)\|}$$

$$\theta_C = \arccos(\min(\hat{d}_1 \cdot \hat{d}_C, \hat{d}_2 \cdot \hat{d}_C, \hat{d}_3 \cdot \hat{d}_C))$$

$$\vec{P}_C = \vec{P}_G - \vec{d}_C \cdot \frac{\max(\|\vec{O_P} - \vec{P}_G\|, \forall \vec{P} \in \Delta P_1 P_2 P_3)}{\sin\theta_C}$$

where $\{\hat{d}_1, \hat{d}_2, \hat{d}_3\}$ is the set of external directions and $\vec{P}_G$ is the barycenter of beam base $\Delta P_1 P_2 P_3$. It can be easily proven that this cone properly contains every point $\vec{Q}$ inside the original view frustum and it works for both $S^n$ and bump-map parameterizations. Once the bounding cone is computed, it can be used for frustum culling as follows. For each scene object, a bounding sphere is computed with center $\vec{O}$ and radius R, and the following steps are used to judge if the sphere and cone intersect. First, one checks if $\vec{P}_C$ is inside the sphere. If not, let $$\theta_S = \arcsin\left(\frac{R}{|\vec{O} - \vec{P}_C|}\right),$$

which is the critical angle formed between $\vec{O} - \vec{P}_C$ and the cone boundary when the sphere and cone boundary barely touch each other. Then it naturally follows that the sphere and cone intersect each other if and only if $$\frac{\vec{O} - \vec{P}_C}{\|\vec{O} - \vec{P}_C\|} \cdot \vec{d}_C > \cos(\theta_C + \theta_S).$$

Wherefore, what is claimed is:

1. A computer-implemented process to display images of one or more objects on a computer display, comprising:
   inputting image data of one or more objects to be displayed on a computer display;
   using non-linear beam tracing, on a computer processing unit (CPU), building a beam tree with nodes which represent beams of light of both a primary linear light beam and non-linear light beams caused by reflections and refractions of the primary beam, recording the boundary rays for each beam of the beam tree, the beams having triangular cross-sections; and rendering the linear and non-linear beams of the beam tree on a graphics processing unit (GPU) to display the one or more objects on the computer display.

2. The computer-implemented process of claim 1 wherein the linear and non-linear beams are defined by three boundary rays, a beam base projected onto a camera sensor plane and a depth in the beam tree.

3. The computer-implemented process of claim 1 wherein the beam tree is constructed in a depth-first traversal order, using the tree root first, followed by a first layer, followed by a second layer.

4. The computer-implemented process of claim 1, further comprising:
sectioning the image data into scene triangles;
for each scene triangle,
projecting the scene triangle onto a beam base of a beam on the camera sensor plane;
defining a bounding triangle that surrounds the projection of the scene triangle onto the beam base of a beam on the sensor plane;
for each pixel within the bounding triangle, defining a ray origin and direction;
determining if each pixel is within the true projection of the scene triangle by determining if the ray that originates at the pixel intersects the scene triangle;
if the pixel within the bounding triangle is within the true projection of the scene triangle, rendering the pixel with the value of the pixel of the scene triangle which intersects the ray; and
if the pixel within the bounding triangle is not within the true projection of the scene triangle not rendering the pixel.

5. The computer-implemented process of claim 4 wherein a bounding triangle for a beam that is perturbed by a bump map is an expansion of a bounding triangle that is computed for a smooth beam.

6. The computer-implemented process of claim 2 further comprising rendering the linear and non-linear beams by:
determining pixel attributes of the one or more objects to be displayed;
storing the determined pixel attributes on each beam base plane for each linear and non-linear beam; and
applying the pixel attributes stored on each base plane for each linear and non-linear beam to a texture mesh of the one or more objects to be displayed.

7. The computer-implemented process of claim 1 further comprising building the beam tree on a computer processing unit and rendering the linear and non-linear beams using a graphics processing unit.

8. A system for displaying graphics on a computer monitor, comprising:
a general purpose computing device;
a computer program comprising program modules executable by the general purpose computing device, wherein the computing device is directed by the program modules of the computer program to,
receive a set of image data composed of one or more objects to be displayed on a computer monitor;
use non-linear beam tracing to create a beam tree for the set of image data composed of a combination of a linear primary light beam and non-linear light beams caused by reflections and refractions, recording the boundary rays for each beam;
divide the set of image data composed of linear and non-linear light beams into a set of scene triangles;
for each scene triangle,
project the scene triangle onto a base of a beam;
define a bounding triangle that surrounds the projection of the scene triangle onto the base of a beam;
for each pixel within the bounding triangle, define a ray origin and direction;
determine if each pixel is within the true projection of the scene triangle by determining if the ray that originates at the pixel intersects the scene triangle;
if the pixel within the bounding triangle is within the true projection of the scene triangle, render the pixel with the value of the pixel of the scene triangle which intersects the ray; and
if the pixel within the bounding triangle is not within the true projection of the scene triangle do not render the pixel.

9. The system of claim 8 wherein the program module to compute the bounding triangle further comprises sub-modules to;
compute a bounding triangle for smooth beams; and
compute a bounding triangle for beams perturbed by a bump map.

10. The system of claim 8 further comprising a program module to input a texture mesh for objects that are reflectors or refractors.

11. The system of claim 10 wherein the program module to render pixels within the true projection of the scene triangle further comprises utilizing the texture mesh to render objects that are reflectors or refractors by applying the rendered pixels to the texture mesh for objects that are reflectors or refractors.

12. A computer-implemented process for displaying three dimensional objects in a scene on a computer display, comprising:
inputting image data to be displayed on a computer display and a texture mesh;
computing a beam parameterization of the image data to define the image data as triangular-shaped smooth and perturbed beams each having a beam base;
using non-linear beam tracing, on a computer processing unit (CPU), computing a beam tree with nodes that represent beams of light of both a linear primary beam and non-linear reflective and refractive beams using the beam parameterization of the image data;
computing a bounding triangle on the beam base for each of the smooth beams, the bounding triangle containing a projection of a scene triangle of the image data;
computing a bounding triangle on the beam base for each of the perturbed beams by expanding the bounding triangle for each of the smooth beams;
dividing the image data into scene triangles;
for each scene triangle, projecting the scene triangle onto a beam base plane;
performing pixel shading by determining how each pixel within each bounding triangle is rendered using a graphics processing unit (GPU) by determining if the pixel is within a true projection of the scene triangle.

13. The computer-implemented process of claim 12 wherein the beam parameterization further comprises, for each point p on a beam base triangle defining an associated ray with a specific origin and direction.

14. The computer-implemented process of claim 12 wherein the pixel parameters used to render the pixel within the bounding triangle are depth, color and texture coordinates.

15. The computer-implemented process of claim 12 wherein determining how each pixel within the bounding triangle is rendered comprises:
- for each pixel within the bounding triangle determining if the computed ray for the given pixel intersects the scene triangle; and
- if the computed ray for the given pixel intersects the scene triangle rendering the pixel with the parameters of the pixel of the scene triangle at the intersection point.

16. The computer-implemented process 12 wherein computing a bounding triangle on the beam base for each of the smooth beams further comprises computing tangent lines of each of the projected edges of each scene triangle.

17. The computer-implemented process of claim 12 further comprising employing a non-linear viewing frustum to cull pixels outside the viewing frustum.

18. The computer-implemented process of claim 12 further comprising projecting a bounding box of an object in a scene onto a beam and utilizing the projection area to estimate the proper level of detail to render for the object.

19. The computer-implemented process of claim 12 further comprising for each bounding triangle, rendering the pixels within the true projection of each scene triangle by culling beam components outside of the bounding triangle and clipping beam components crossing a border of the bounding triangle.

\* \* \* \* \*